(12) United States Patent
Colmagro et al.

(10) Patent No.: US 10,994,380 B2
(45) Date of Patent: May 4, 2021

(54) DEVICE FOR MANIPULATING A HOLLOW SHAFT INTENDED TO CREATE A PIVOT LINK BETWEEN A FIRST ELEMENT AND A SECOND ELEMENT

(71) Applicant: Airbus Operations SAS, Toulouse (FR)

(72) Inventors: Jérôme Colmagro, Toulouse (FR); Aurélien Mauconduit, Cugnaux (FR); Julien Moulis, Le Castera (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 106 days.

(21) Appl. No.: 16/199,795

(22) Filed: Nov. 26, 2018

(65) Prior Publication Data

US 2019/0160606 A1 May 30, 2019

(30) Foreign Application Priority Data

Nov. 28, 2017 (FR) ...................................... 1761275

(51) Int. Cl.
*B23P 19/02* (2006.01)
*B23P 19/10* (2006.01)
(Continued)

(52) U.S. Cl.
CPC ............. *B23P 19/02* (2013.01); *B23P 19/022* (2013.01); *B23P 19/10* (2013.01); *B23P 19/12* (2013.01); *B25B 27/02* (2013.01); *B64F 5/10* (2017.01); *F16C 11/04* (2013.01); *B21D 39/20* (2013.01); *B23P 2700/01* (2013.01);
(Continued)

(58) Field of Classification Search
CPC ....... Y10T 29/53848; Y10T 29/53857–53861; Y10T 29/53878–53887; B23P 19/022; B23P 19/025; B23P 19/02; B23P 19/04; B25B 27/02; B25B 27/023; B25B 27/06; B25B 27/062; B25J 15/0047; B25J 15/0038; B64D 2027/262
See application file for complete search history.

(56) References Cited

U.S. PATENT DOCUMENTS 3,077,916 A * 2/1963 Vaughn ................ B21D 41/026
72/393
3,327,377 A * 6/1967 German ................ B25B 27/062
29/263

(Continued)

*Primary Examiner* — Matthew P Travers
(74) *Attorney, Agent, or Firm* — Greer, Burns & Crain, Ltd.

(57) ABSTRACT

A device for manipulating a hollow shaft configured to create a pivot link between a first element and a second element. The manipulation device comprises a cylindrical body having a diameter variable by radial contraction or radial expansion of the cylindrical body, a module for controlling the diameter of the cylindrical body configured so that the diameter of the cylindrical body has alternatively at least a first diameter suitable for the cylindrical body to be displaced in the hollow shaft and a second diameter suitable for the cylindrical body to be blocked in the hollow shaft. The cylindrical body comprises an end configured to protrude from the hollow shaft when the cylindrical body is blocked in the hollow shaft. The manipulation device allows the alignment of the orifices due to the end configuration of the cylindrical body.

3 Claims, 4 Drawing Sheets

(51) Int. Cl.
*B23P 19/12* (2006.01)
*B64F 5/10* (2017.01)
*B25B 27/02* (2006.01)
*B25B 27/14* (2006.01)
*F16C 11/04* (2006.01)
*B64D 27/26* (2006.01)
*B21D 39/20* (2006.01)

(52) U.S. Cl.
CPC .............. *B25B 27/14* (2013.01); *B64D 27/26* (2013.01); *B64D 2027/262* (2013.01)

(56) References Cited

U.S. PATENT DOCUMENTS

| | | | | |
|---|---|---|---|---|
| 3,986,383 | A * | 10/1976 | Petteys | B21D 1/08 72/393 |
| 4,104,775 | A * | 8/1978 | Lawless | B25B 27/02 29/265 |
| 4,521,959 | A * | 6/1985 | Sprenkle | H05K 13/0491 29/741 |
| 5,074,536 | A * | 12/1991 | McConkey | B23Q 3/183 269/43 |
| 8,511,133 | B1 * | 8/2013 | Chen | B21D 41/028 72/393 |
| 2010/0005639 | A1 * | 1/2010 | Muller | B23P 19/02 29/256 |
| 2011/0266389 | A1 * | 11/2011 | Combes | B64D 27/26 244/54 |

* cited by examiner

DEVICE FOR MANIPULATING A HOLLOW SHAFT INTENDED TO CREATE A PIVOT LINK BETWEEN A FIRST ELEMENT AND A SECOND ELEMENT

CROSS-REFERENCES TO RELATED APPLICATIONS

This application claims the benefit of the French patent application No. 1761275 filed on Nov. 28, 2017, the entire disclosures of which are incorporated herein by way of reference.

BACKGROUND OF THE INVENTION

The present invention relates to a device for manipulating a hollow shaft. The hollow shaft is intended to create a pivot link between a first element and a second element through the engagement of the hollow shaft in an orifice of the first element and an orifice of the second element.

The manipulation of a shaft making it possible to create a pivot link between two elements can pose a problem when the access to the orifices allowing the shaft to be engaged is limited. Indeed, when this access is limited, it can be difficult to check whether the orifices of the two elements are aligned to be able to engage the shaft in the orifices.

An aircraft engine is linked to a wing of the aircraft by a pylon. The assembly of the pylon with the engine is done through pivot links. Now, the access making it possible to produce these pivot links is very limited, which sometimes prevents the alignment of the orifices from being checked before the shafts are engaged in the orifices.

SUMMARY OF THE INVENTION

An object of the present invention is to overcome these drawbacks by proposing a device that makes it possible to align the orifices before the shaft is engaged in the orifices.

To this end, the invention relates to a device for manipulating a hollow shaft having a first longitudinal axis, the hollow shaft being intended to create a pivot link between a first element and a second element through the engagement of the hollow shaft in at least one orifice of the first element and in at least one orifice of the second element.

According to the invention, the device comprises:
a cylindrical body having a second longitudinal axis, the cylindrical body being configured to be introduced into the hollow shaft so that the second longitudinal axis is parallel to the first longitudinal axis, the cylindrical body having a diameter that is variable through radial contraction or radial expansion of the cylindrical body,
a module for controlling the diameter of the cylindrical body, the control module being configured so that the diameter of the cylindrical body has alternately at least one first diameter suitable for the cylindrical body to be able to be displaced in the hollow shaft and a second diameter suitable for the cylindrical body to be blocked in the hollow shaft,
the cylindrical body comprising a first end configured to protrude from the hollow shaft when the cylindrical body is blocked in the hollow shaft.

Thus, the first end of the cylindrical body protruding from the hollow shaft makes it possible to align the orifices of the first element and of the second element without an operator having to visually check the alignment before a hollow shaft is engaged in the orifices.

Advantageously, the first end has a generally conical form.

Furthermore, the cylindrical body comprises:
at least two cylinder segments extending along the second longitudinal axis,
at least one elastic ring retaining the cylinder segments so as to form the cylindrical body.

Furthermore, the control module comprises:
a threaded rod, and
a first clamping piece and a second clamping piece, the two clamping pieces being screwed onto the threaded rod,
the cylindrical body having an opening extending along the second longitudinal axis into which the threaded rod is inserted, the first clamping piece being situated at the first end of the cylindrical body, the second clamping piece being situated at the second end of the cylindrical body,
the clamping pieces being configured so that:
a convergence by screwing of the second clamping piece toward the first clamping piece along the threaded rod creates a radial separation of the cylinder segments, the radial separation of the cylinder segments providing an increase in the diameter of the cylindrical body,
a separation by unscrewing of the second clamping piece from the first clamping piece along the threaded rod creates a radial convergence of the cylinder segments, the elastic ring or rings allowing the radial convergence of the cylinder segments as the second clamping piece moves away from the first clamping piece, the radial convergence of the cylinder segments providing a reduction in the diameter of the cylindrical body.

For example, each of the clamping pieces has a generally conical form, the cone of each of the clamping pieces having:
a height along which the threaded rod is screwed, and
a vertex directed toward the cylindrical body when the clamping pieces are screwed onto the threaded rod.

According to a particular feature, the device further comprises a module for extracting the hollow shaft engaged in at least one orifice of the first element and in at least one orifice of the second element, the extraction module comprising a detection system configured to detect a resistance likely to be exerted on the hollow shaft and tending to prevent the disengagement of the hollow shaft, the extraction module being configured to disengage the hollow shaft from the orifice or orifices of the first element and from the orifice or orifices of the second element if the resistance detected by the detection system is below a predetermined threshold.

Furthermore, the detection system corresponds to a mechanical system comprising at least one elastic member, the elastic member or members having properties chosen to allow the disengagement of the hollow shaft if the resistance is below the predetermined threshold.

According to one embodiment, the mechanical system further comprises:
a bearing surface configured to be arranged at a fixed distance relative to the first and second elements,
a compression surface configured to compress the elastic member or members against the bearing surface when the compression surface is brought closer to the bearing surface, the elastic member or members exerting a force tending to separate the compression surface from the bearing surface,
a threaded opening integral to the compression surface, the threaded opening being configured to bring the compression surface closer to or away from the bearing surface when the threaded opening is screwed or unscrewed on the threaded rod.

According to a variant, the elastic member or members comprise at least one helical spring having a longitudinal axis parallel to the second longitudinal axis, the helical spring or springs comprise a first end bearing on the bearing surface and a second end bearing on the compression surface, the helical spring or springs having a stiffness allowing the compression surface to be moved away from the bearing surface by driving the cylindrical body and the hollow shaft via the threaded rod, if the resistance that is exerted on the hollow shaft is below the predetermined threshold.

Thus, the choice of spring stiffness makes it possible to choose the force value below which the disengagement of the hollow shaft can be possible.

According to another variant, the elastic member or members comprise at least one hydraulic or pneumatic element, the hydraulic or pneumatic elements comprising a first end fixed to the bearing surface and a second end fixed to the compression surface, the hydraulic or pneumatic element or elements being configured to move the compression surface away from the bearing surface by driving the cylindrical body and the hollow shaft via the threaded rod, if the resistance that is exerted on the hollow shaft is below the predetermined threshold.

The invention relates also to a method for engaging a hollow shaft in at least one orifice of a first element and in at least one orifice of a second element using a manipulation device as described above, the hollow shaft being intended to create a pivot link between the first element and the second element through the engagement of the hollow shaft in the orifices.

According to the invention, the engagement method comprises:

a first step of radial contraction of the cylindrical body using the control module so that the diameter of the cylindrical body is equal to the first diameter, a step of introduction of the cylindrical body into the hollow shaft, a step of radial expansion of the cylindrical body using the control module so that the diameter of the cylindrical body is equal to the second diameter, a step of engagement of the first end then of the hollow shaft in the orifice or orifices of the first element and of the second element as soon as, or when, the orifices are aligned, a second step of radial contraction of the cylindrical body using the control module so that the diameter of the cylindrical body is equal to the first diameter, a step of extraction of the cylindrical body from the hollow shaft.

Furthermore, the radial expansion step comprises bringing the second clamping piece and the first clamping piece closer together by screwing along the threaded rod to drive a radial separation of the cylinder segments, the radial separation of the cylinder segments providing an increase in the diameter of the cylindrical body.

Furthermore, the second radial contraction step comprises moving the second clamping piece away from the first clamping piece by unscrewing along the threaded rod to drive a radial convergence of the cylinder segments, the elastic ring or rings allowing the radial convergence of the cylinder segments as the second clamping piece is moved away from the first clamping piece, the radial convergence of the cylinder segments providing a reduction in the diameter of the cylindrical body.

The invention relates also to a method for disengaging a hollow shaft from at least one orifice of a first element and from at least one orifice of a second element using the manipulation device as described above, the hollow shaft being intended to create a pivot link between the first element and the second element through the engagement of the hollow shaft in the orifices.

According to the invention, the disengagement method comprises:

a first step of radial contraction of the cylindrical body using the control module so that the diameter of the cylindrical body is equal to the first diameter, a step of introduction of the cylindrical body into the hollow shaft, a step of radial expansion of the cylindrical body using the control module so that the diameter of the cylindrical body is equal to the second diameter, a step of preparation of the extraction module, a step of disengagement of the hollow shaft as soon as, or when, the resistance detected by the detection module and that is exerted on the hollow shaft, tending to prevent the disengagement of the hollow shaft is below a predetermined threshold.

Furthermore, the step of preparation of the extraction module comprises compressing the elastic member by bringing the compression surface closer to the bearing surface.

Furthermore, the disengagement step comprises moving the compression surface away from the bearing surface using the elastic member, the compression surface being configured to drive the cylindrical body and the hollow shaft via the threaded rod, if the resistance detected by the detection module and that is exerted on the hollow shaft, tending to prevent the disengagement of the hollow shaft, is below a predetermined threshold.

BRIEF DESCRIPTION OF THE DRAWINGS

The invention, with its features and advantages, will emerge more clearly on reading the description given with reference to the attached figures in which:

FIG. 9 represents a longitudinal cross section of the manipulation device according to another embodiment.

DETAILED DESCRIPTION OF THE PREFERRED EMBODIMENTS

Figure 2:
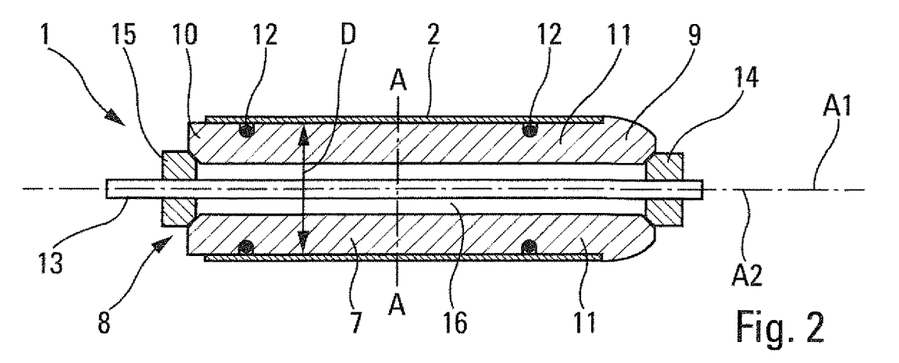
FIG. 2 represents a longitudinal cross section of the manipulation device according to an embodiment.

FIG. 2 illustrates an embodiment of the device 1 for manipulating a hollow shaft 2.

The hollow shaft 2 has a longitudinal axis A1.

Figure 1:
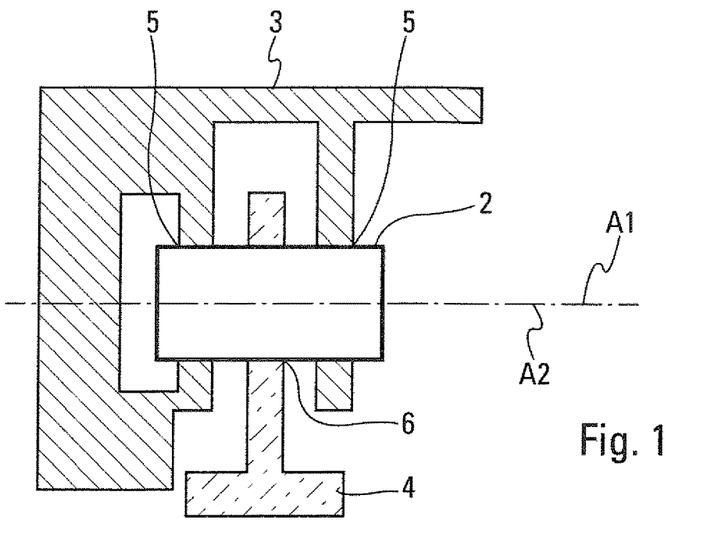
FIG. 1 represents a cross-sectional schematic view of the first element and of the second element as pivot link via a hollow shaft.

The hollow shaft 2 is configured to create a pivot link between an element 3 and an element 4 through the engagement of the hollow shaft 2 in at least one orifice 5 of the element 3 and in at least one orifice 6 of the element 4 (FIG. 1). FIG. 1 schematically illustrates an element 3 corresponding to a pylon and an element 4 corresponding to an aircraft engine.

The manipulation device 1 makes it possible to engage a hollow shaft 2 in the orifices 5, 6. It also makes it possible to disengage the hollow shaft 2 from the orifices 5, 6.

The manipulation device 1 comprises a cylindrical body 7 having a longitudinal axis A2 and a diameter D that is variable by radial contraction or radial expansion of the cylindrical body 7. This cylindrical body 7 is configured to be introduced into the hollow shaft 2 so that the longitudinal axis A2 is parallel to the longitudinal axis A1. Preferably, the longitudinal axis A2 and the longitudinal axis A1 are merged, when the cylindrical body 7 is introduced into the hollow shaft 2.

The manipulation device 1 also comprises a module 8 for controlling the diameter D of the cylindrical body 7. The control module 8 makes it possible to modify the diameter D of the cylindrical body 7.

The control module 8 is configured so that the diameter D of the cylindrical body 7 has, alternatively, at least one diameter D1 suitable for the cylindrical body 7 to be able to be displaced in the hollow shaft 2 and a diameter D2 suitable for the cylindrical body 7 to be blocked in the hollow shaft 2.

The cylindrical body 7 comprises an end 9. The end 9 is configured to engage the manipulation device 1 and the hollow shaft 2 in the orifice or orifices 5 and 6 of the element 3 and of the element 4. The end 9 is configured to protrude from the hollow shaft 2 when the cylindrical body 7 is blocked in the hollow shaft 2. The end 9 makes it possible to ensure that the orifices 5 and 6 are aligned. It also makes it possible to align the orifices 5 and 6 if they are not aligned before the hollow shaft 2 is engaged in the orifices. As soon as the orifices 5 and 6 are aligned, the end 9 can be engaged in the orifices 5 and 6, then the hollow shaft 2 driven by the manipulation device 1.

Advantageously, the first end 9 has a generally conical form. The definition of the conical form can be understood within a wide definition. In particular, the conical form can mean a projectile nose form. It can also mean all the forms that facilitate the engagement of the end 9 and, consequently, of the hollow shaft 2 in the orifices 5 and 6.

Furthermore, the base of the conical form of the first end 9 can have a diameter greater than or equal to the diameter of the hollow shaft 2 to be manipulated so that the cylindrical body 7 has a shoulder at the base of the conical form. This shoulder forms an abutment against the hollow shaft 2 when the cylindrical body 7 is blocked in the hollow shaft 2.

According to an embodiment, the cylindrical body 7 comprises at least two cylinder segments 11 extending along the longitudinal axis A2.

Figure 6:
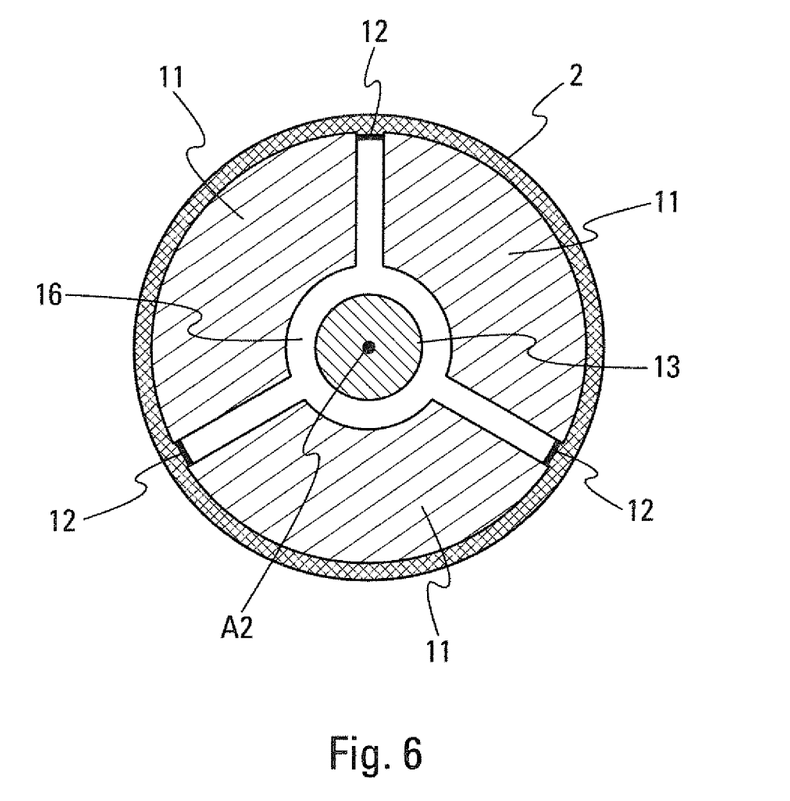
FIG. 6 represents a transverse cross section of the manipulation device and of the hollow shaft along a cutting line A-A represented in FIG. 2.

Preferably, the cylindrical body 7 comprises three cylinder segments 11. However, a higher number of cylinder segments is possible. FIG. 6 presents a transverse cross section A-A of the manipulation device 1 represented in FIG. 2 with three cylinder segments 11.

In a nonlimiting way, the cylinder segments 11 are manufactured from metal, for example titanium.

The cylindrical body 7 also comprises at least one elastic ring 12 retaining the cylinder segments 11 so as to form the cylindrical body 7. The or each of the elastic rings 12 lie in a plane substantially at right angles to the longitudinal axis A2.

The elasticity of the ring or rings 12 allows the radial expansion and the radial contraction of the diameter D of the cylindrical body 7.

Advantageously, the or each of the elastic rings 12 is housed in a groove.

In a nonlimiting way, the elastic ring or rings 12 correspond to O-ring seals.

The control module 8 can include a threaded rod 13, a clamping piece 14 and a clamping piece 15. The two clamping pieces 14 and 15 are screwed onto the threaded rod 13.

The cylindrical body 7 has an opening 16 extending along the longitudinal axis A2 into which the threaded rod 13 is inserted. The clamping piece 14 is situated at the end 9 of the cylindrical body 7. The clamping piece 15 is situated at the end 10 of the cylindrical body 7.

The elastic rings 12 retain the cylinder segments 11 on the threaded rod 13. The clamping pieces 14 and 15 make it possible to set the expansion and the contraction of the cylindrical body 7.

Thus, a convergence of the clamping piece 15 toward the clamping piece 14 by screwing along the threaded rod 13 drives a radial separation of the cylinder segments 11. The radial separation of the cylinder segments 11 thus provides an increase in the diameter D of the cylindrical body 7.

Furthermore, a separation of the clamping piece 15 from the clamping piece 14 by unscrewing along the threaded rod 13 drives a radial convergence of the cylinder segments 11. The elastic ring or rings 12 generate the radial convergence of the cylinder segments 11 as the clamping piece 15 moves away from the clamping piece 14. The radial convergence of the cylinder segments 11 thus provides a reduction in the diameter D of the cylindrical body 7.

Preferably, each of the clamping pieces 14 and 15 has a generally conical form. The cone of each of the clamping pieces 14 and 15 has a height along which the threaded rod 13 is screwed and a vertex directed toward the cylindrical body 7 when the clamping pieces 14 and 15 are screwed onto the threaded rod 13. The definition of the word cone can be taken in a wide sense. For example, the clamping pieces 14 and 15 can have the form of a projectile nose, a tapered form or any other form facilitating the radial separation of the cylinder segments 11.

Figure 3:
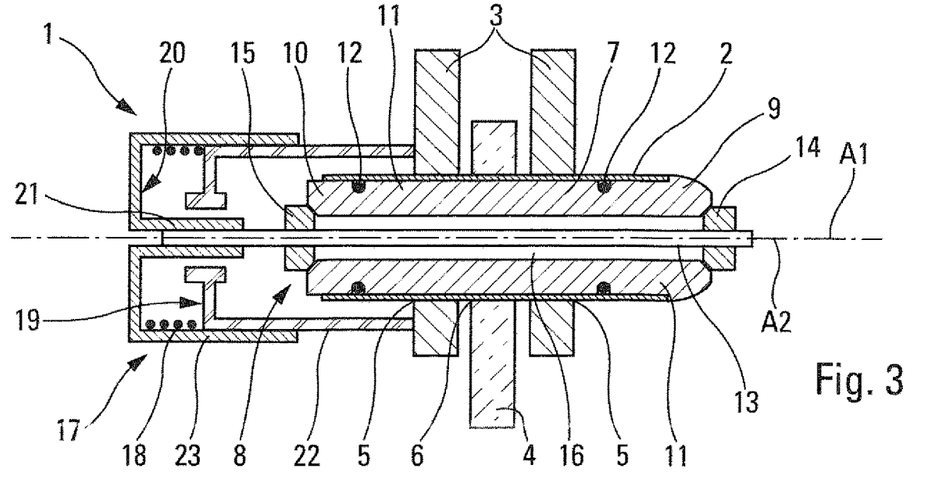
FIG. 3 represents a longitudinal cross section of the manipulation device according to another embodiment.

According to an embodiment illustrated in FIG. 3, the manipulation device 1 further comprises a module 17 for extracting the hollow shaft 2 engaged in at least one orifice 5 of the first element 3 and in at least one orifice 6 of the second element 4.

The extraction module 17 is configured to disengage the hollow shaft 2 from the orifice or orifices 5 of the first element 3 and from the orifice or orifices 6 of the second element 4 if the resistance, likely to be exerted on the hollow shaft 2 and tending to prevent the disengagement of the hollow shaft 2, is below a predetermined threshold. The resistance corresponds, for example, to a sum of the shear forces that are exerted on the hollow shaft 2 and generated by the first element 3 and the second element 4.

The extraction module 17 comprises a detection system configured to detect the resistance. The extraction module 17 is configured to disengage the hollow shaft 2 from the orifice or orifices 5 of the first element 3 and from the orifice or orifices 6 of the second element 4, if the resistance detected by the detection system is below the predetermined threshold.

According to a first embodiment (not represented), the extraction module comprises a part that can be gripped. The part that can be gripped is configured to be grasped by an operator. The operator can pull continuously on the extraction module 7 via the part that can be gripped to find the moment at which the hollow shaft 2 is disengaged using the detection system.

According to a second embodiment (not represented), the extraction module 17 comprises an electric motor. The electric motor is configured to pull on the hollow shaft 2 and to act as detection system. The electric motor thus having a torque configured to disengage the hollow shaft 2 if the resistance that is exerted on the hollow shaft 2 is below the predetermined threshold.

According to a third embodiment, the detection system corresponds to a mechanical system comprising at least one elastic member. The elastic member or members have properties chosen to allow the disengagement of the hollow shaft 2 if the resistance is below the predetermined threshold.

An elastic member corresponds, for example, to a spring or a hydraulic or pneumatic element or any other member that makes it possible to detect a resistance and to disengage the hollow shaft 2 when the resistance is below a predetermined threshold.

According to a variant, the mechanical system also comprises:

a bearing surface 19 configured to be arranged at a fixed distance relative to the first and second elements 3, 4, a compression surface 20 configured to compress the elastic member or members 18 against the bearing surface 19 when the compression surface 20 is brought closer to the bearing surface 19, the elastic member or members 18 exerting a force tending to separate the compression surface 20 from the bearing surface 19, a threaded opening 21 integral to the compression surface 20, the threaded opening 21 being configured to move the compression surface 20 closer to or away from the bearing surface 19 when the threaded opening 21 is screwed or unscrewed on the threaded rod 13.

In the embodiment of FIG. 3, the bearing surface 19 corresponds to an outer circular surface of an at least partially closed circular end of a hollow cylinder 22. The hollow cylinder 22 is then arranged on an element 3 at the other circular end of the cylinder which is open. The hollow cylinder 22 thus covers the protruding end of the hollow shaft 2.

In the embodiment of FIG. 3, the compression surface 20 corresponds to an inner circular surface of an at least partially closed circular end of a hollow cylinder 23. The hollow cylinder 22 is fitted in the hollow cylinder 23 by clamping the helical spring 18 between the bearing surface 19 and the compression surface 20.

The threaded opening 21 is configured to move the compression surface 20 closer to or away from the bearing surface 19 when the threaded opening 21 is screwed or unscrewed on the threaded rod 13. In the embodiment of FIG. 3, the threaded opening 21 is arranged at the center of the circular end of the hollow cylinder 23. The threaded rod 13 passes also through the circular end of the hollow cylinder 22. The opening allowing the passage of the threaded rod 13 at the center of the circular end of the hollow cylinder 22 has a diameter large enough for the threaded rod to be displaced freely through this opening.

According to a variant of the third embodiment (represented in FIG. 3), the elastic member or members 18 comprise at least one helical spring 18. The helical spring or springs 18 have a longitudinal axis parallel to the longitudinal axis A2 and comprise a first end bearing on the bearing surface 19 and a second end bearing on the compression surface 20. Furthermore, the helical spring or springs have a stiffness allowing the compression surface 20 to be moved away from the bearing surface 19 by driving the cylindrical body 7 and the hollow shaft 2 via the threaded rod 13, if the resistance that is exerted on the hollow shaft 2 is below the predetermined threshold. Thus, it is possible to define the resistance value below which the disengagement of the hollow shaft 2 is allowed by defining an appropriate helical spring 18 stiffness value.

According to another variant of the third embodiment (represented in FIG. 9), the elastic member or members 18 comprise at least one hydraulic or pneumatic element. The hydraulic or pneumatic element or elements comprise a first end 18a fixed to the bearing surface 19 and a second end 18b fixed to the compression surface 20. The hydraulic or pneumatic element or elements are dimensioned with a force allowing the compression surface 20 to be moved away from the bearing surface 19 by driving the cylindrical body 7 and the hollow shaft 2 via the threaded rod 13, if the resistance is below the predetermined threshold.

The hydraulic or pneumatic element or elements can comprise a jack whose longitudinal axis is parallel to the longitudinal axis A2 and which has at the first end 18a a piston and at the second end 18b a cylinder. For example, the piston 18a is fixed to the bearing surface 19 and the cylinder 18b is fixed to the compression surface 20.

The manipulation device 1 thus makes it possible to mechanically detect the conditions allowing a disengagement of a hollow shaft 2 from the orifices 5 and 8 of the two elements 3 and 4. That then makes it possible to disengage the hollow shaft 2 without having to visually check that the elements 3 and 4 are aligned. Furthermore, the extraction module 17 is configured to be arranged at one end of the hollow shaft 2. The access to another end of the hollow shaft 2 is not necessary. That makes it possible to disengage the hollow shaft 2, when the access to the hollow shaft 2 is limited. The manipulation device 1 makes it possible to implement a method for engaging a hollow shaft 2 in at least one orifice 5 of a first element 3 and in at least one orifice 6 of a second element 4.

Figure 4A:
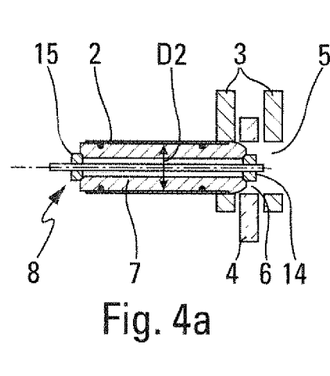
FIGS. 4a to 4d represent cross-sectional views of the manipulation device in different steps of the method for engaging a hollow shaft.
Figure 4B:
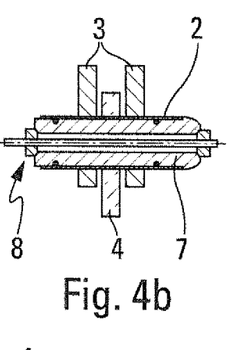
Figure 4C:
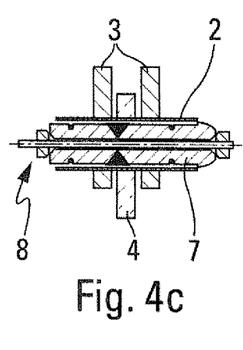
Figure 4D:
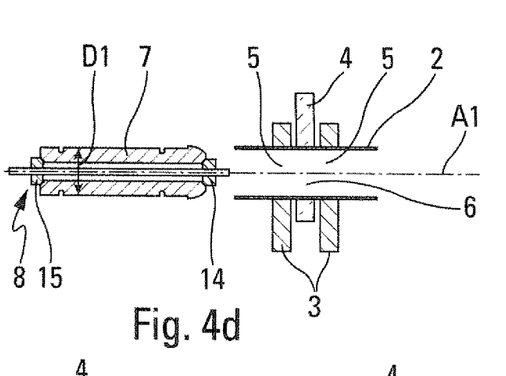
Figure 7:
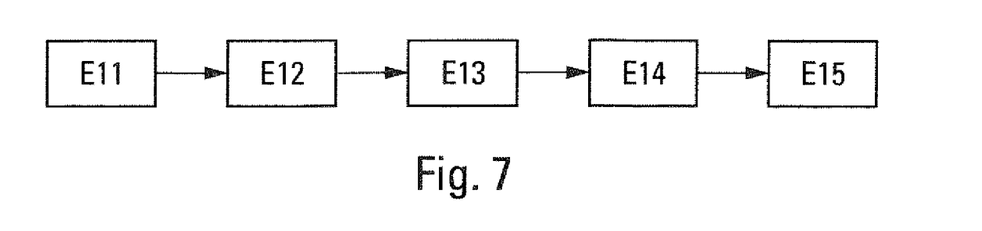
FIG. 7 represents a block diagram view of the method for engaging a hollow shaft.

The engagement method comprises, as represented in FIG. 7:

a step E11 of radial contraction of the cylindrical body 7 using the control module 8 so that the diameter D of the cylindrical body 7 is equal to the first diameter D1, a step E12 of introduction of the cylindrical body 7 into the hollow shaft 2, a step E13 of radial expansion of the cylindrical body 7 using the control module 8 so that the diameter D of the cylindrical body 7 is equal to diameter D2, a step E14 of engagement of the end 9 then of the hollow shaft 2 in the orifice or orifices 5, 6 of the first element 3 and of the second element 4 as soon as the orifices 5 and 6 are aligned (FIG. 4a). The engagement of the step E14 is performed until the hollow shaft 2 is correctly arranged to produce the pivot link (FIG. 4b), a step E15 of radial contraction of the cylindrical body 7 using the control module 8 so that the diameter D of the cylindrical body 7 is equal to the first diameter D1 (FIG. 4c), a step E16 of extraction of the cylindrical body 7 from the hollow shaft 2 (FIG. 4d).

The engagement of the end 9 makes it possible to align the orifices 5 and 6 in order for the hollow shaft 2 to be able to be engaged.

The radial expansion step E13 can comprise bringing the clamping piece 15 closer to the clamping piece 14 by screwing along the threaded rod 13 to drive a radial separation of the cylinder segments 11. The radial separation of the cylinder segments 11 provides an increase in the diameter D of the cylindrical body 7.

Furthermore, the radial contraction step E15 (FIG. 4c) can comprise moving the clamping piece 15 away from the clamping piece 14 by unscrewing (in the reverse direction of the screwing) along the threaded rod 13 to drive a radial convergence of the cylinder segments 11. The elastic ring or rings 12 allow the radial convergence of the cylinder segments 11 as the clamping piece 15 moves away from the clamping piece 14. The radial convergence of the cylinder segments 11 provides a reduction in the diameter D of the cylindrical body 7.

Figure 8:
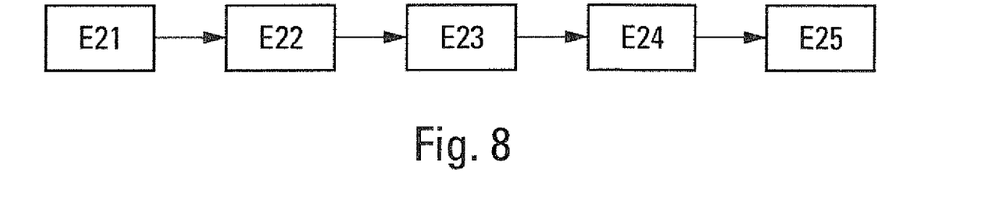
FIG. 8 represents a block diagram view of the method for disengaging a hollow shaft.

The manipulation device 1 also makes it possible to implement a method for disengaging a hollow shaft 2 from at least one orifice 5 of a first element 3 and from at least one orifice of a second element 4.

Figure 5A:
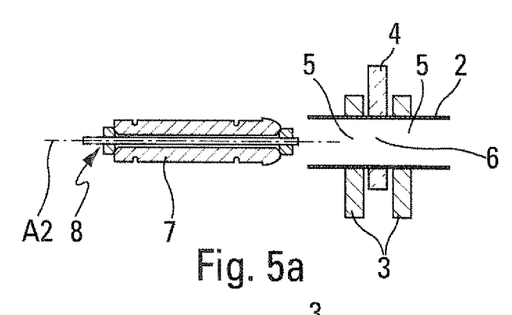
FIGS. 5a to 5g represent cross-sectional views of the manipulation device in different steps of the method for disengaging a hollow shaft.
Figure 5B:
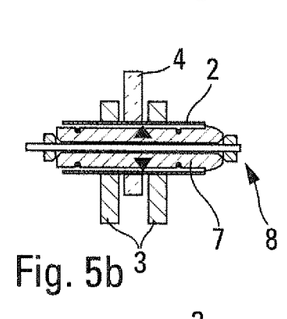
Figure 5C:
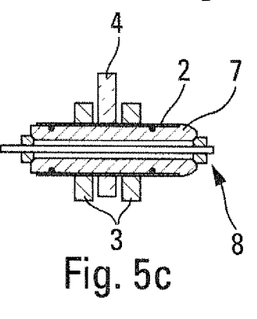

The disengagement method comprises, as represented in FIG. 8:
a step E21 of radial contraction of the cylindrical body 7 using the control module 8 so that the diameter D of the cylindrical body 7 is equal to the diameter D1 (FIG. 5a),
a step E22 of introduction of the cylindrical body 7 into the hollow shaft 2 engaged in the orifices of the element 3 and of the element 4 (FIG. 5b),
a step E23 of radial expansion of the cylindrical body 7 using the control module 8 so that the diameter D of the cylindrical body 7 is equal to the diameter D2 (FIG. 5c),
a step E24 of preparation of the extraction module 17 (FIG. 5f),
a step E25 of disengagement of the hollow shaft 2 (FIG. 5g) as soon as the resistance detected by the detection module and that is exerted on the hollow shaft 2, tending to prevent the disengagement of the hollow shaft 2 is below a predetermined threshold.

Figure 5D:
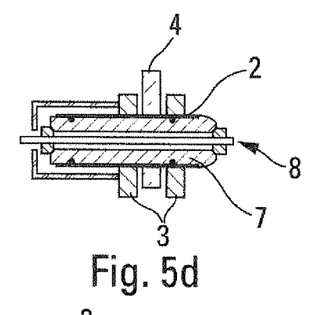
Figure 5E:
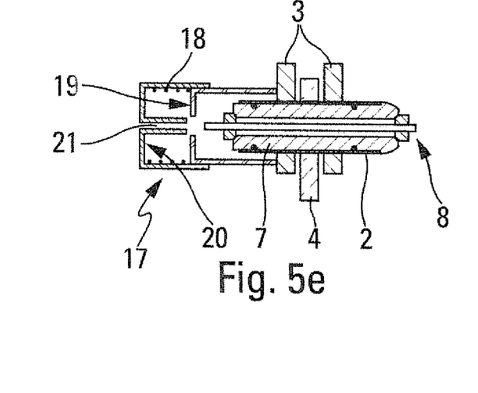
Figure 5F:
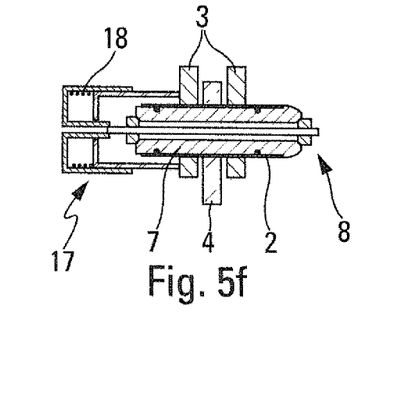

The step E24 of preparation of the extraction module 17 can comprise compressing the elastic member 18 by bringing the compression surface 20 closer to the bearing surface 19.

The step E24 of preparation of the extraction module 17 of the manipulation device 1 can be preceded by the placement of the bearing surface 19 (FIG. 5d) on an element 3 or 4. The compression surface 20 is then put in place by clamping the helical spring 18 between the bearing surface 19 and the compression surface 20 (FIG. 5e).

Figure 5G:
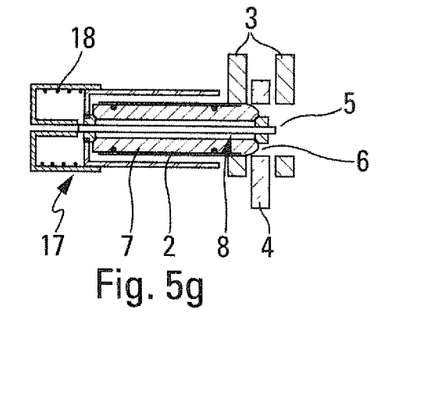

The disengagement step E25 can comprise moving the compression surface 20 away from the bearing surface 19 using the elastic member 18. The compression surface 20 is configured to drive the cylindrical body 7 and the hollow shaft 2 via the threaded rod 13, if the resistance detected by the detection module and that is exerted on the hollow shaft 2, tending to prevent the disengagement of the hollow shaft 2, is below a predetermined threshold.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for disengaging a hollow shaft from at least one orifice of a first element and from at least one orifice of a second element using a manipulation device, the hollow shaft having a first longitudinal axis, an interior surface of the hollow shaft being smooth, the manipulation device for manipulating the hollow shaft comprising:

a cylindrical body having a second longitudinal axis, an exterior surface of the cylindrical body being smooth, the cylindrical body being configured to be introduced into the hollow shaft so that the second longitudinal axis is parallel to the first longitudinal axis, the cylindrical body having a diameter that is variable through radial contraction or radial expansion of the cylindrical body, a control module to control the diameter of the cylindrical body, the control module being configured so that the diameter of the cylindrical body has alternatively at least one first diameter suitable for the cylindrical body to be able to be displaced in the hollow shaft and a second diameter suitable for the cylindrical body to be blocked in the hollow shaft, the cylindrical body comprising a first end configured to protrude from the hollow shaft when the cylindrical body is blocked in the hollow shaft, the first end having a conical form, a base of the conical form of the first end having a diameter greater than or equal to a diameter of the hollow shaft, the cylindrical body having a shoulder at the base of the conical form of the first end, said shoulder forms an abutment against the hollow shaft when the cylindrical body is blocked in the hollow shaft, an extraction module to extract the hollow shaft engaged in the at least one orifice of the first element and in the at least one orifice of the second element, the extraction module comprising a detection system configured to detect a resistance likely to be exerted on the hollow shaft and tending to prevent a disengagement of the hollow shaft, the extraction module being configured to disengage the hollow shaft from the at least one orifice of the first element and from the at least one orifice of the second element if the resistance detected by the detection system is below a predetermined threshold, the hollow shaft being configured to create the pivot link between the first element and the second element through the engagement of the hollow shaft in the orifices, the method comprising:

radially contracting the cylindrical body using the control module so that the diameter of the cylindrical body is equal to the first diameter, introducing the cylindrical body into the hollow shaft, radially expanding the cylindrical body using the control module so that the diameter of the cylindrical body is equal to the second diameter, preparing the extraction module, disengaging the hollow shaft when the resistance detected by the detection system and that is exerted on the hollow shaft, tending to prevent the disengagement of the hollow shaft, is below a predetermined threshold.

2. The method as claimed in claim 1, wherein the detection system corresponds to a mechanical system comprising at least one elastic member, the at least one elastic member configured to allow the disengagement of the hollow shaft if the resistance is below the predetermined threshold, the mechanical system further comprising a bearing surface configured to be arranged at a fixed distance relative to the first and second elements and a compression surface configured to compress the at least one elastic member against the bearing surface when the compression surface is brought closer to the bearing surface, the at least one elastic member exerting a force tending to separate the compression surface from the bearing surface, and wherein the step of preparing the extraction module comprises compressing the at least one elastic member by bringing the compression surface closer to the bearing surface.

3. The method as claimed in claim 2, wherein the disengagement step comprises moving the compression surface away from the bearing surface using the elastic member, the compression surface being configured to drive the cylindrical body and the hollow shaft via a threaded rod, if the resistance detected by the detection system and that is exerted on the hollow shaft, tending to prevent the disengagement of the hollow shaft, is below a predetermined threshold.

* * * * *